US012572674B2

(12) United States Patent
Arora et al.

(10) Patent No.: US 12,572,674 B2
(45) Date of Patent: Mar. 10, 2026

(54) NEURO-SYMBOLIC ARTIFICIAL INTELLIGENCE-BASED ASSESSMENT SYSTEM

(71) Applicant: Bank of America Corporation, Charlotte, NC (US)

(72) Inventors: Saurabh Arora, Gurugram (IN); Shailendra Singh, Maharashtra (IN); Sunilkumar Sriperambudur, Telangana (IN); Sandeep Kumar Chauhan, Miyapur (IN)

(73) Assignee: Bank of America Corporation, Charlotte, NC (US)

( * ) Notice: Subject to any disclaimer, the term of this patent is extended or adjusted under 35 U.S.C. 154(b) by 131 days.

(21) Appl. No.: 18/661,176

(22) Filed: May 10, 2024

(65) Prior Publication Data

US 2025/0348603 A1     Nov. 13, 2025

(51) Int. Cl.
*G06F 21/60*          (2013.01)
*G06F 21/31*          (2013.01)

(52) U.S. Cl.
CPC .......... *G06F 21/604* (2013.01); *G06F 21/316* (2013.01)

(58) Field of Classification Search
CPC .............................. G06F 21/604; G06F 21/316
USPC ......................................................... 726/27
See application file for complete search history.

(56) References Cited

U.S. PATENT DOCUMENTS

| | | | |
|---|---|---|---|
| 9,269,114 B2 | 2/2016 | Boss et al. | |
| 10,656,975 B2 | 5/2020 | Zolotow et al. | |
| 11,170,300 B2 * | 11/2021 | Dalli ................... | G06N 3/0464 |
| 11,194,716 B2 | 12/2021 | Noble et al. | |
| 11,579,950 B2 | 2/2023 | Miedema et al. | |
| 11,704,168 B2 | 7/2023 | Godwin | |
| 12,260,328 B2 * | 3/2025 | Kimura ................. | G06N 3/092 |
| 2018/0097905 A1 | 4/2018 | Todasco et al. | |
| 2023/0123860 A1 | 4/2023 | Marquie et al. | |
| 2023/0196063 A1 | 6/2023 | Latapie et al. | |
| 2023/0297712 A1 | 9/2023 | Veeraraghavan et al. | |
| 2024/0004973 A1 | 1/2024 | Bosch et al. | |
| 2024/0029422 A1 * | 1/2024 | Qasemi ................. | G06F 40/20 |
| 2024/0169129 A1 * | 5/2024 | Cobb ...................... | G06F 30/27 |
| 2024/0185081 A1 * | 6/2024 | Agravante ............. | G06F 40/30 |
| 2024/0212348 A1 * | 6/2024 | Latapie ................. | G06V 20/52 |

* cited by examiner

*Primary Examiner* — Amare F Tabor
(74) *Attorney, Agent, or Firm* — Banner & Witcoff, Ltd.

(57) ABSTRACT

Various aspects of the disclosure relate to dynamically determining user access levels to manage access to enterprise information via application programming interfaces (APIs). A neuro-symbolic AI-based assessment enabled system manages assessments and response to API calls to ensure data security of information shared with external sources via the API. This system identifies and analyze access patterns via neural networks and symbolic reasoning to dynamically manage a rule set to determine access levels and corresponding data sub-objects that are built in real time to be shared with an API response message.

20 Claims, 3 Drawing Sheets

100

NEURO-SYMBOLIC ARTIFICIAL INTELLIGENCE-BASED ASSESSMENT SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to manage its computer systems efficiently, effectively, securely, and uniformly, and particularly manage how internal computer systems exchange information with external computer systems in providing and/or supporting different products and services offered by the organization.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like). Aspects of the disclosure relate to computer hardware and software. In particular, one or more aspects of the disclosure generally relate to computer hardware and software for application programming interfaces (APIs) that secure data access attempts and intelligently improve access security measures.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes identification of access patterns via neural networks and symbolic reasoning to identify access levels and corresponding sub-objects and performing partial data transfers to ensure data security.

Open banking has rapidly taken its place in most, if not all, financial institution's technical landscape. Open banking related processes and systems may allow easier sharing of information between different financial institutions. While allowing third parties to pull a customer's financial details may provide a good user experience, but it often comes with unforeseen technical challenges. For example, a financial institution must ensure that any application programming interfaces (APIs) exposed to external interfaces are used only by an approved and verified data consumer that has the right intent and that the APIs only share the required (and authorized) information.

For example, the financial institution's banking platform API access by third party applications (e.g., to pull customer financials via open banking channels) returns information once calls are authenticated. However, the API does not control and/or make decisions of restricting certain information, such as by building sub-objects on the go based on interaction symbols. Current APIs lack digital identity validation for source of consumer calls, such as through use of the usual service identifier (ID) and/or token checks that are only used for service call validations that can be forged by using tokens from valid calls in a same flow. Open banking can facilitate more efficient financial transfers from multiple new channels. In doing so, new open banking consumer calls must remain in control of fraud assessments and digital identity validation for restricted data transfer and mechanisms to assess behavior leading to dynamic objects in response.

In some cases, a neuro-symbolic artificial intelligence (AI)-based assessment enabled system may provide a unique way to assess and respond to API calls (e.g., open banking API calls) that ensures information is shared with external sources with more control on what can be shared in phased response objects. This system may identify and analyze access patterns by leveraging neural networks and symbolic reasoning to decide access levels and corresponding sub-objects that are built in real time to be shared with an API response message. The neuro-symbolic AI-based assessment enabled system keeps original enterprise system of record (SOR) data stores abstract from external API call processing and maintains a separate shareable storage system that persists with an evolving object structure for controlled sharing with external API calls. Partial data transfer may be used to ensure data security and be leveraged when providing continuous assessment with a dynamic map and render to further add to the remaining data set with evolving object transfers. As such, the neuro-symbolic AI-based assessment system provides a unique way to control which information is shared and provide fulfillment of API responses based on phased add-ons.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
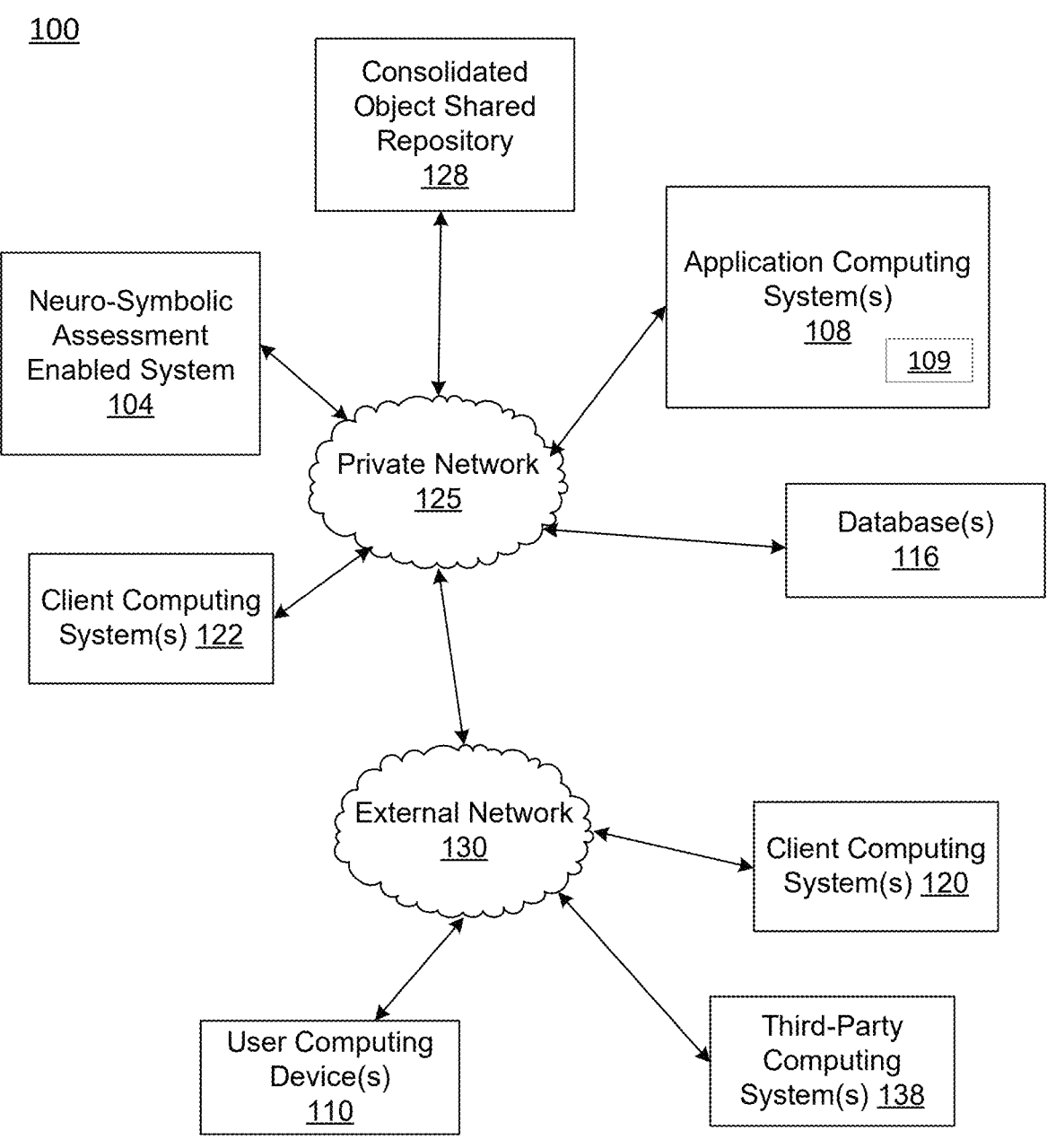
FIG. 1A shows an illustrative computing environment for providing secure data access via APIs, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

The neuro-symbolic assessment enabled system may include a mechanism to filter a corresponding API response with partial object transfers with periodic add-ons. This mechanism may allow identification of malicious function calls from applications posing as a valid open banking consumer that may otherwise lead to unintended disclosure of information.

The neuro-symbolic assessment enabled system may also include a mechanism to perform assessment of actions triggered by application calls via an API interface, select symbols that can indicate digital identity, and build corresponding payload fields to consolidate objects to be transferred in real time via the API call.

The neuro-symbolic assessment enabled system may perform methods that do not change object structure within enterprise storage SORs and allow for storage and transfer of partial objects against real time assessments in response to API-based requests.

FIG. 1A shows an illustrative computing environment 100 for providing secure data access via APIs, in accordance with one or more arrangements. The computing environment 100 may comprise one or more devices (e.g., computer systems, communication devices, and the like). The computing environment 100 may comprise, for example, a neuro-symbolic assessment enabled system 104, one or more application system 108, one or more client computing systems 120, a consolidated object shared repository 128, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise one or more client computing systems 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a 3rd Generation Partnership Project (3GPP) cellular protocol, a hypertext transfer protocol (HTTP), etc.). While FIG. 1A shows the neuro-symbolic assessment enabled system 104 as a separate computing system, the neuro-symbolic assessment enabled system 104 may be incorporated into one or more different computing systems, such as the application computing systems 108.

The neuro-symbolic assessment enabled system 104 may comprise one or more computing devices and/or other computer components (e.g., processors, memories, communication interfaces) configured to perform one or more functions as described herein. Further details associated with the architecture of the neuro-symbolic assessment enabled system 104 are described with reference to FIG. 1B.

The application computing systems 108 and/or the client computing systems 122 may comprise one or more computing devices and/or other computer components (e.g., processors, memories, communication interfaces). In addition, the application computing systems 108 and/or the client computing systems 122 may be configured to host, execute, and/or otherwise provide one or more enterprise applications. In some cases, the application computing systems 108 may host one or more services 109 configured facilitate operations requested through one or more API calls, such as data retrieval and/or initiating processing of specified functionality. In some cases, the client computing systems 122 may be configured to communicate with one or more of the application computing systems 108 such as via direct communications and/or API function calls and the services 109. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The client computing systems 122 and/or the application computing systems 108 may comprise various servers and/or databases that store and/or otherwise maintain account information, such as financial account information including account balances, transaction history, account owner information, and/or other information. In addition, the client computing systems 122 and/or the application computing systems 108 may process and/or otherwise execute transactions on specific accounts based on commands and/or other information received from other computer systems comprising the computing environment 100. In some cases, one or more of the client computing systems 122 and/or the application computing systems 108 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing systems 120 and/or third-party computing systems 138 may comprise one or more computing devices and/or other computer components (e.g., processors, memories, communication interfaces). The client computing systems 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing systems 120 is for processing an electronic exchange of goods and/or services. The client computing systems 120 and/or the third-party computing systems 138 be associated with a specific goods purchasing activity, such as purchasing a vehicle, transferring title of real estate may perform communicate with one or more other platforms within the client computing systems 120 and/or the third-party computing systems 138. In some cases, the client computing systems 120 may integrate API calls to request data, initiate functionality, or otherwise communicate with the one or more application computing systems 108, such as via the services 109. For example, the services 109 may be configured to facilitate data communications (e.g., data gathering functions, data writing functions, and the like) between the client computing systems 120, the third-party computing systems 138, and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the neuro-symbolic assessment enabled system 104. For example, the database(s) 116 may store API code of an API, neuro-symbolic API test classes, models, and/or patterns, and the like. In an arrangement, the database(s) 116 may be used for other purposes as described herein. In some cases, the client computing systems 120 may write data or read data to the database(s) 116 via the services 109. In some cases, the consolidated object shared repository 128 may be actively built and/or updated in real-time based on the neuro-symbolic assessment of API function calls received from applications and/or computing systems requesting access to secure data within the enterprise network. For example, the consolidated object shared repository 128 may be built based on data requested via API function calls based on a security level and/or security assessment of the calling computing system and/or associated user via neuro-symbolic assessments.

In one or more arrangements, the neuro-symbolic assessment enabled system 104, the application computing systems 108, the client computing systems 120, the databases 116, the client computing systems 122, the consolidated object shared repository 128, the third-party computing systems 138, the user devices 110, and/or the other devices/systems in the computing environment 100 may be any type of computing device capable of receiving input via a user interface, and communicating the received input to one or more other computing devices in the computing environment 100. For example, the neuro-symbolic assessment enabled system 104, the application computing systems 108, the client computing systems 120, the databases 116, the client computing systems 122, the consolidated object shared repository 128, the third-party computing systems 138, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the neuro-symbolic assessment enabled system 104, the application computing systems 108, the client computing systems 120, the databases 116, the client computing systems 122, the consolidated object shared repository 128, the third-party computing systems 138, the user devices 110, and/or the other devices/systems in the computing environment 100 may, in some instances, be and/or comprise special-purpose computing devices configured to perform specific functions.

Figure 1B:
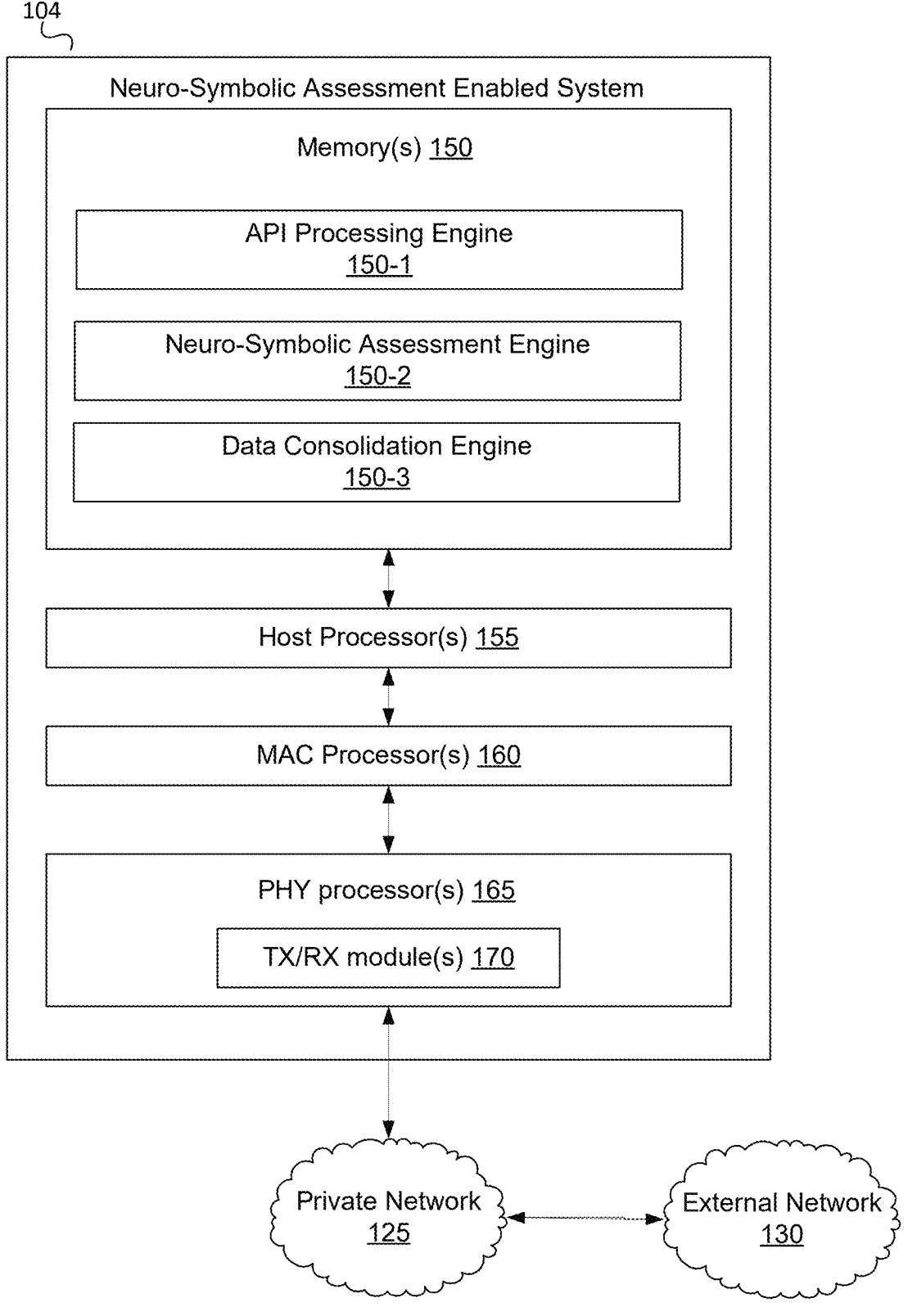
FIG. 1B shows an illustrative computing platform enabled for providing secure data access via APIs, in accordance with one or more aspects described herein.

FIG. 1B shows an illustrative neuro-symbolic assessment enabled system 104 in accordance with one or more examples described herein. The neuro-symbolic assessment enabled system 104 may be a stand-alone device and/or may at least be partial integrated with the neuro-symbolic assessment enabled system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The neuro-symbolic assessment enabled system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the neuro-symbolic assessment enabled system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the neuro-symbolic assessment enabled system 104 may be configured to execute machine readable instructions stored in memory 150. The memory 150 may comprise (i) one or more program modules/engines having instructions that when executed by the one or more processors cause the neuro-symbolic assessment enabled system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the neuro-symbolic assessment enabled system 104 and/or by different computing devices that may form and/or otherwise make up the neuro-symbolic assessment enabled system 104. For example, the memory 150 may have, store, and/or comprise an API processing engine 150-1, a neuro-symbolic assessment engine 150-2, a data consolidation engine 150-3, and/or the like. The API processing engine 150-1 may have instructions that direct and/or cause the neuro-symbolic assessment enabled system 104 to perform one or more operations associated with processing API function calls including identifying source information, associated user information, and assembling and communicating responses, and the like. The neuro-symbolic assessment engine 150-2 may have instructions that may cause the neuro-symbolic assessment enabled system 104 to perform neural network based assessments utilizing symbolic reasoning to identify symbols for use a indicators for real-time identity validation for each processed API function call. The data consolidation engine 150-3 may have instructions that may cause the neuro-symbolic assessment enabled system 104 to build, in real time, the consolidated object data repository 128 to isolate enterprise system of record information storage and management systems from direct external access via API function calls.

While FIG. 1A illustrates the neuro-symbolic assessment enabled system 104, and/or the application computing systems 108, as being separate elements connected in the private network 125, in one or more other arrangements, functions of one or more of the above may be integrated in a single device/network of devices. For example, elements in the neuro-symbolic assessment enabled system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the application computing systems 108.

Figure 2:
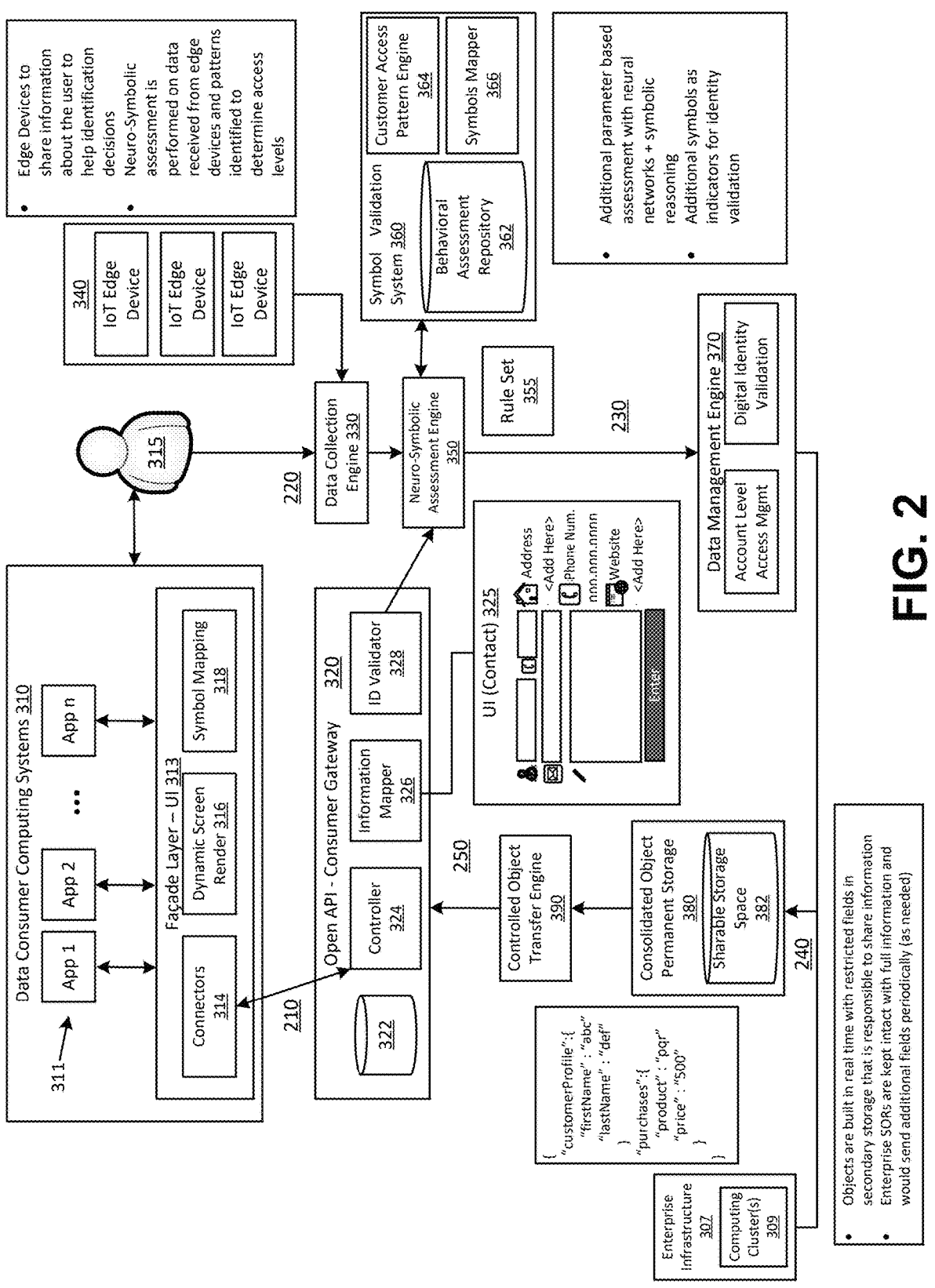
FIG. 2 shows an illustrative computing system performance of a process to secure data access via APIs in accordance with one or more aspects described herein.

FIG. 2 shows an illustrative computing system 300 performing of a process 200 to secure data access via APIs in accordance with one or more aspects described herein. The system 300 includes one or more data consumer computing systems 310 (e.g., client computing systems 120 and 122, third-party computing systems 138, and/or the like), an open API consumer gateway 320, a data collection engine 330 communicably coupled to one or more user devices 110 and/or one or more Internet of Things (IoT) edge devices 340 associated with the user 315, a neuro-symbolic assessment engine 350, a symbol validation system 360, a data management engine 370 and/or a consolidated object permanent storage device 380 communicably coupled to an enterprise infrastructure system 307 (e.g., one or more application computing systems 108), and a controlled object transfer engine 390.

The data consumer computing systems 310 may provide an operational computing platform for one or more data consuming applications 311 that may request and/or receive data from one or more computing systems (e.g., the computing clusters 309, the application computing systems 108, the client computing systems 120, and/or the like) via API function calls. For example, the data consumer computing systems 310 may include a façade layer (e.g. a UI layer 313) that may facilitate API function call operation by the data consuming applications. For example, connectors 314 may provide one or more communication channels for each application 311 to communicate via API function calls to the enterprise computing system, such as via a gateway (e.g., the open API consumer gateway 320) of the enterprise computing network. The façade layer may also facilitate operation of data gathering features for the neuro-symbolic based data security measures. For example, the façade layer (e.g., UI layer 313) may include a dynamic screen rendering engine 316 and/or a symbol mapping engine 318. The neuro-symbolic assessment enabled system provides controlled object transfer with continuously updated object structure against neuro symbolic assessment for digital identity validation. For example, at 210, a third-party application may initiate one or more API calls to fetch information from the financial institution's system of records (SORs). The API calls may trigger consumer assessment operations that trigger nearby edge devices to collect and share user data with the neuro-symbolic assessment enabled system.

Here, the data collection engine 330 may collect data from the user 315 via one or more user interface screens presented via a user computing device 110 and/or from one or more computing devices associated with the user (e.g., the one or more IoT edge devices 340). The IoT edge devices 340 may share information about the user to help identification decisions. For example, the IoT edge devices may be used and/or may be approved by the user to provide user authentication information, such as user activity information at particular geographic locations (e.g., a gateway connecting to a smart device associated with the user). In some cases, neuro-symbolic assessment may be performed on data received from the IoT edge devices 340 and patterns identified to determine access levels associated with and API-based data transfer to and/or from the enterprise computing system. The enterprise-provided API may include functions that allow external applications read and/or write data from/to one or more applications operational on the enterprise network, without allowing direct access to the computing systems.

Additionally, the connectors 314 may communicate via a network (e.g., the public network 130) to the open API consumer gateway 320 via a communication channel such as to initiate a data transfer request to or from the enterprise infrastructure 307. The open API consumer gateway 320 may include a data store 322, a controller 324, an information mapper 326 and an identification (ID) validator 328. The data store 322 may store data to facilitate operation of the open API consumer gateway, such as data mappings, data channel information, identification validation information, and/or the like. The controller 324 may facilitate communications between an external communication channel interface to and from the connectors 314 of the data consumer computing systems 310 and/or the controlled object transfer engine 390. The information mapper 326 may map information retrieved based on the API function calls to, for example, information fields on a user interface screen (e.g., the user interface 325). The ID validator 328 may provide information corresponding to the user 315 associated with the API information request to a validation engine, such as the neuro-symbolic assessment engine 350 and the symbol validation system 360. The symbol validation system 360 may include a behavioral assessment repository 362, a customer access pattern engine 364, a symbols mapping engine 366, and/or the like.

The neuro-symbolic assessment engine 350 and/or the symbol validation system 360 may utilize a neural network (e.g., a deep neural network) and a symbolic reasoning architecture to provide an artificial intelligence-based system capable of reasoning, learning and cognitive modeling. The neural-symbolic system may include one or more different neuro-symbolic architectures, such as symbolic neural symbolic, symbolic[neural], neural|symbolic, neural: symbolic→neural, Neural_{symbolic}, neural[symbolic], and/or the like. Each of the above approaches may utilize different neural network architectures and/or symbolic reasoning processes to perform the neural-symbolic operations and is a non-exhaustive list. Many approaches have been used to provide a decisioning system that operates similarly to how a human makes decisions. For example, certain neuro-symbolic architectures may utilize vector-symbolic architectures to combine learning representations provided by neural networks with compositional aspects of multi-dimensional and/or distributed vectors. The neuro-symbolic assessment engine 350 and/or the symbolic validation system 360 may utilize additional parameter-based assessment that may be combined with neural network processing and symbolic reasoning to perform user validation based on user information collected from the user 315, IoT sensor information received from the IoT edge devices 340, along with identification information received from the ID validator of the API consumer gateway 320. Additional symbols, such as those stored in the symbol validation system 360 may be used as indicators for identify validation. In some cases, the symbol information may be retrieved from the IoT edge devices 340, where the symbols may be used by the customer access pattern engine 364 to identify different behavioral patterns based on user activity information, where symbols may be mapped by the symbol mapper 366 to consumer behavioral patterns and may be stored in and/or compared to patterns stored in the behavioral assessment repository.

At 220, the IoT edge devices 340 may share information about the user to facilitate decisioning actions on identity validation. The neuro-symbolic assessment enabled system performs neuro symbolic assessment with neural network and symbolic reasoning on data received from the IoT edge devices and identifies patterns to decide an access level for that particular consumer (at that location and/or at that particular time). This assessment further maps to particular information is to be shared with consumer based on the consumer validation operations. For example, a consumer identification may be associated with one or more data access levels based on the API function call, the data requested to be accessed (e.g., read access request, write access request, a bulk data transfer request, and the like), the enterprise system being accessed, and/or the like.

At 230, identity validation against assessment performed at 220 may lead to controlled forming of data structures and pulling of respective sub-objects and hidden access markers, without the consumer's awareness, to allow the neuro-symbolic assessment enabled system to decide what information can be shared with the consumer for the particular API call or calls. For example, the user validation information may be associated with one or more user access levels (e.g., a data access level object), where the data management engine 370 may perform account-level data access management operations and/or digital identity validation operations. At 240, with respect to the access level decided at 230, objects are built in real time, such as by the data management engine 370, with restricted fields and persisted in a secondary storage (e.g., a local data repository, a cloud-based data repository, the consolidated object permanent storage 380 and/or the sharable storage space 382, and the like) that is configured to buffer and/or share information via validated API calls. Enterprise SORs remain intact with full information and may provide send additional fields periodically to updated persisted partial objects, when required to fulfil a validated data request via the API calls.

In some cases, the neuro-symbolic assessment engine 350 and/or the symbol validation system 360 may dynamically build a neuro-symbolic rule set for verification of the user 315. The user 315 may be a customer utilizing a third-party application dynamically leveraging API functionality to access secure data on the enterprise system and/or an IoT device communicably coupled to one of the IoT edge devices 340 that is automatically leveraging the API function calls to autonomously perform actions based on data returned from the API calls. In some cases, the data collection engine 330 may present a user interface screen (e.g., a loading page) unique to each user interaction, based on the API function calls and/or the specific data consuming application utilizing the function calls. In some cases, the user interface screen may be customized based on information received from one or more IoT devices in the vicinity of the user 315.

The neuro-symbolic assessment engine 350 may process a rule set 355 to customize the user interface presented to the user based on information received from the IoT edge devices 340. For example, if an IoT edge device identifies that the user is located in a known and/or trusted geographic location, the rule set 355 may cause a first set of user identifier requests to be presented to the user. If the user 315 is identified as being in an unknown or untrusted geographic location, the rule set 355 may cause a second set of user identifier requests to be presented to the user 315. The neuro-symbolic assessment engine 350 may adapt the rule set based on information received and/or confirmation of the user identification based on the symbolic validation of the user information received via the user interface. For example, when a user is successfully identified and verified via the user interface, the rule set may automatically be adapted to include a previously unknown geographic location as a neutral location, to allow for an increased access level for users at that location. As such, the neuro-symbolic assessment engine 350 may continuously adapt the rule set 355 based on the user information received via the IoT edge devices 340 and/or the user information screen.

In some cases, one or more of the IoT edge devices 340 may communicate to one or more IoT devices located in proximity to the user 315, where the one or more IoT devices may be portable with the user (e.g., a wearable sensor), and/or may include motion or other interaction sensors in a location near the user (e.g., a motion sensing switch, a smart appliance, a smart light, and the like). The IoT edge devices 340 may communicate movement or other behavioral information corresponding to the user 315 and/or other individuals within the environment close to the user 315. In some cases, the IoT edge devices 340 may communicate sensor information comprising audio and/or video information about an environment in proximity to the user 315. The neuro-symbolic assessment engine 350 may analyze the user information collected by the data collection engine 330 from direct user interaction and/or from environmental information in proximity to the user and/or in locations normally frequented by the user 315. The neuro-symbolic assessment engine 350 may analyze the information, along with symbolic information associated with the user provided by the symbol validation system 360 based on analysis of the same and/or additional user information to dynamically create, delete and/or modify an authentication and/or validation rule set. In some case, the rule set may be adjusted to decrease an authorization level based on an increase of other individuals in proximity to the user, such as to protect inadvertent sharing of private and/or non-public information. In some cases, the rule set may be adjusted to increase an authorization level for a user in different locations as the system learns new geographic locations associated with a change in user behavior (e.g., a new work location, a new residence location, and/or the like). If, for example, a user 315 has requested potentially sensitive information while in an unusual geographic location, or in a known geographic location having a senses unusual amount of local activity, the rule set may be dynamically adjusted to decrease an authorization level, such that the consolidated object permanent storage may be built with less information, such that the sharable information is created without private or non-public information and such information remains protected from external API access within the enterprise infrastructure 307.

In some cases, each data object may be sequentially built based on the access levels and/or the user validation information such that a data object associated with a consumer purchase may first be created in the sharable storage space 382 with user information (e.g., customer profile information comprising a first name, a last name or both the first name and last name). On subsequent API requests, corresponding to continued access level and/or user validation information, the data object may be expanded to include further information. For example, upon a first successful user access level validation, a sharable data object may be created in the sharable storage space 382. With subsequent requests with additional successful user validations, additional information may be added to the sharable data object until a maximum data access level for the user 315, and/or a combination of user information and requesting application information, reaches a maximum level. In an illustrative example, the sharable data object may first store user name information (e.g., first name, last name, middle name) as specified by data access rules associated with the user access level and is stored (and persists) in the sharable storage space 382. As the user validation continues and the access level increases with subsequent API requests, the sharable data object may be further built to include, such as for a transaction data record, to include product information, price information, date information, time information, vendor information, payment type information, and/or the like. Such information may be sequentially added based on current access level information associated with the user. In some cases, the user may be assigned a maximum access level upon a first validation event by the neuro-symbolic assessment engine 350, where the data management engine 370 may sequentially build each requested data object until the data object is complete and/or to match the allowable accessible data associated with the access level associated with the user 315.

In some cases, the sharable storage space 382 may be created unique to a customer, an application, a communication session, and/or the like. In some cases, information stored in the sharable storage space 382 may persist for a duration of an active communication session for a particular user and/or with a particular application. In some cases, the information stored in the sharable storage space 382 may persist until a user validation failure, an application disconnect event, a user access level demotion, and/or the like. As such, the information stored in the consolidated object permanent storage 380 may remain secure and may be limited to data to which the user has permission to access based on a maximum identified access level.

At 250, selected information (pulled from the shareable storage space 382), is sent to the data consumer application in response to the API call. A dynamic rendering module may generate, in real time, a user interface to present respective fields that are updated as more information is pulled with increased confidence. Such functionality enables the neuro-symbolic assessment enabled system to control, based on validated customer information, in ways that protects data integrity and security of the enterprise data without risk to the whole enterprise ecosystem through use of regulated object transfers.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
   an enterprise computing device hosting at least one data repository;
   one or more Internet of things (IoT) edge devices;
   a neuro-symbolic assessment platform, comprising:
      a processor; and
      memory storing computer-readable instructions that, when executed by the processor, cause the neuro-symbolic assessment platform to:
         receive, from a data consuming application, an API function call;
         receive, based on the API function call, user information from the one or more IoT edge devices;
         generate a neuro-symbolic rule set based on the user information;
         determine, based on neuro-symbolic analysis of the user information and the neuro-symbolic rule set, a data access level; and
         build, based on the data access level and from the at least one data repository of the enterprise computing device, a consolidated data repository, wherein the consolidated data repository comprises data associated with a response to the API function call; and
         return, to the data consuming application, at least one portion of data stored in the consolidated data repository.

2. The system of claim 1, wherein the instructions further cause the cause the neuro-symbolic assessment platform to receive, from the API function call, a user identifier and wherein the user information is received based on the user identifier.

3. The system of claim 1, wherein the data consuming application is operational on a third-party computing system external to an enterprise computing network comprising the enterprise computing device.

4. The system of claim 1, wherein the one or more IoT edge devices collect information from IoT devices in proximity to a user.

5. The system of claim 1, wherein the neuro-symbolic analysis of the user information comprises identifying a user behavioral pattern.

6. The system of claim 1, wherein the instructions cause the neuro-symbolic assessment platform to dynamically build each data object stored in the consolidated data repository.

7. The system of claim 6, wherein the instructions further cause the neuro-symbolic assessment platform to dynamically adjust the neuro-symbolic rule set based on geographic locations associated with the one or more IoT edge devices.

8. A neuro-symbolic assessment platform, comprising:
   a processor; and
   memory storing computer-readable instructions that, when executed by the processor, cause the neuro-symbolic assessment platform to:
      receive, from a data consuming application, an API function call;
      receive, based on the API function call, user information from one or more IoT edge devices;
      generate a neuro-symbolic rule set based on the user information;
      determine, based on neuro-symbolic analysis of the user information and the neuro-symbolic rule set, a data access level; and
      build, based on the data access level and from at least one data repository of an enterprise computing device, a consolidated data repository, wherein the consolidated data repository comprises data associated with a response to the API function call; and return, to the data consuming application, at least one portion of data stored in the consolidated data repository.

9. The neuro-symbolic assessment platform of claim 8, wherein the instructions further cause the cause the neuro-symbolic assessment platform to receive, from the API function call, a user identifier and wherein the user information is received based on the user identifier.

10. The neuro-symbolic assessment platform of claim 8, wherein the data consuming application is operational on a third-party computing system external to an enterprise computing network comprising the enterprise computing device.

11. The neuro-symbolic assessment platform of claim 8, wherein the one or more IoT edge devices collect information from IoT devices in proximity to a user.

12. The neuro-symbolic assessment platform of claim 8, wherein the neuro-symbolic analysis of the user information comprises identifying a user behavioral pattern.

13. The neuro-symbolic assessment platform of claim 8, wherein the instructions cause the neuro-symbolic assessment platform to iteratively build each data object stored in the consolidated data repository.

14. The neuro-symbolic assessment platform of claim 13, wherein the instructions further cause the neuro-symbolic assessment platform to dynamically adjust the neuro-symbolic rule set based on geographic locations associated with the one or more IoT edge devices.

15. Non-transitory computer readable media storing instructions that, when executed by a processor, cause a neuro-symbolic assessment platform to:

receive, from a data consuming application, an API function call;

receive, based on the API function call, user information from one or more IoT edge devices;

generate a neuro-symbolic rule set based on the user information;

determine, based on neuro-symbolic analysis of the user information and the neuro-symbolic rule set, a data access level; and build, based on the data access level and from at least one data repository of an enterprise computing device, a consolidated data repository, wherein the consolidated data repository comprises data associated with a response to the API function call; and return, to the data consuming application, at least one portion of data stored in the consolidated data repository.

16. The non-transitory computer readable media of claim 15, wherein the instructions further cause the cause the neuro-symbolic assessment platform to receive, from the API function call, a user identifier and wherein the user information is received based on the user identifier.

17. The non-transitory computer readable media of claim 16, wherein the data consuming application is operational on a third-party computing system external to an enterprise computing network comprising the enterprise computing device.

18. The non-transitory computer readable media of claim 15, wherein the one or more IoT edge devices collect information from IoT devices in proximity to a user.

19. The non-transitory computer readable media of claim 15, wherein the neuro-symbolic analysis of the user information comprises identifying a user behavioral pattern.

20. The non-transitory computer readable media of claim 15, wherein the instructions further cause the neuro-symbolic assessment platform to dynamically adjust the neuro-symbolic rule set based on geographic locations associated with the one or more IoT edge devices.

* * * * *